United States Patent
Weng et al.

(10) Patent No.: US 9,800,065 B2
(45) Date of Patent: Oct. 24, 2017

(54) CHARGING SYSTEM AND EQUIPMENT AND METHOD THEREOF

(71) Applicant: AVer Information Inc., New Taipei (TW)

(72) Inventors: Chien-Wen Weng, New Taipei (TW); Lung-Te Lin, New Taipei (TW); Ta-Chun Lin, New Taipei (TW)

(73) Assignee: Aver Information Inc., New Taipei (TW)

( * ) Notice: Subject to any disclaimer, the term of this patent is extended or adjusted under 35 U.S.C. 154(b) by 135 days.

(21) Appl. No.: 14/841,217

(22) Filed: Aug. 31, 2015

(65) Prior Publication Data

US 2016/0336766 A1 Nov. 17, 2016

(30) Foreign Application Priority Data

May 13, 2015 (TW) .............................. 104115235 A

(51) Int. Cl.
*H02J 7/00* (2006.01)

(52) U.S. Cl.
CPC .......... *H02J 7/0021* (2013.01); *H02J 7/0027* (2013.01)

(58) Field of Classification Search
CPC ................................ H02J 7/0021; H02J 7/007
USPC ....................................................... 320/162
See application file for complete search history.

(56) References Cited

U.S. PATENT DOCUMENTS

| | | | |
|---|---|---|---|
| 8,805,530 B2 * | 8/2014 | John | A61N 1/3785 607/34 |
| 9,124,122 B2 * | 9/2015 | Kim et al. | H02J 5/005 |
| 9,306,399 B2 * | 4/2016 | Kim et al. | B60L 11/182 |
| 2014/0191712 A1 * | 7/2014 | Rea et al. | H02J 5/005 320/108 |
| 2016/0372952 A1 * | 12/2016 | Chen et al. | H02J 7/0054 |

\* cited by examiner

*Primary Examiner* — Sun Lin
(74) *Attorney, Agent, or Firm* — Muncy, Geissler, Olds & Lowe, P.C.

(57) ABSTRACT

A charging equipment including a charging module, a communicating module, and a control module. The charging module is configured to charge a device for charging according to a control signal and produce a detecting signal according to a magnitude of an output current of the charging module. The communicating module has a communicating range. The communicating module selectively outputs the detecting signal produced by the charging module to another charging equipment operating in the same communicating range, or selectively receives a detecting signal produced by another charging equipment operating in the same communicating range. The control module electrically connects to the communicating module. The control module selectively produces the control signal according to an adjusting signal produced by another charging equipment, or selectively produces the control signal and the adjusting signal according to a detecting signal produced by said another charging equipment and the detecting signal produced by the charging module.

16 Claims, 3 Drawing Sheets

CHARGING SYSTEM AND EQUIPMENT AND METHOD THEREOF

CROSS-REFERENCE TO RELATED APPLICATIONS

This non-provisional application claims priority under 35 U.S.C. §119(a) on Patent Application No. 104115235 filed in Taiwan, R.O.C. on May 13, 2015, the entire contents of which are hereby incorporated by reference.

BACKGROUND

Technical Field

The present disclosure relates to a charging system, particularly relates to charging system capable of controlling multiple charging equipments.

Description of the Related Art

In recent years, the portable electronic device is getting more and more popular and the needs of the plugs of mains electricity for charging are soaring accordingly. In this kind of situation, users often face the problem of plug shortage. Therefore, the dealers start to offer charging equipments capable of containing and charging multiple portable electronic devices, such as the charging vehicle or the charging cabinet.

Although the charging cabinet can charge more electronic devices, however, in the environment with more charging needs, such as a company, a factory, a school, or a cram school, a charging cabinet may not be sufficient either. In order to fulfill the huge needs for charging, users may sets up multiple charging cabinets in the same environment for charging more electronic devices. However, when multiple charging cabinets are in operation, the instant current of the power supplier may be overloaded and results in the power trip problem.

Therefore, the charging management for multiple charging equipments is the most urgent problem.

SUMMARY

A charging system includes a first charging equipment and a second charging equipment. The first charging equipment includes a first charging module, a first communicating module, and a first control module. The first charging module is electrically connected to an external power and is for charging at least one first device for charging electrically connected to the first charging equipment according to a first control signal and generating a first detecting signal according to a magnitude of an output current from the first charging module. The first communicating module has a first communicating range and is for outputting the first detecting signal. The first control module is electrically connected to the first communicating module and is for generating the first control signal according to an adjusting signal received by the first communicating module. The second charging equipment includes a second charging module, a second communicating module, and a second control module. The second charging module is electrically connected to the external power and is for charging at least one second device for charging electrically connected to the second charging equipment according to a second control signal and generating a second detecting signal according to a magnitude of an output current from the second charging module. The second communicating module in the first communicating range is for receiving the first detecting signal and outputting the adjusting signal to the first communicating module. The second control module is electrically connected to the second communicating module and is for generating the second control signal and the adjusting signal according to the first detecting signal and the second detecting signal.

A charging equipment includes a charging module, a communicating module, and a control module. The charging module is electrically connected to a external power and is for charging at least one device for charging electrically connected to the charging equipment according to a control signal and generating a detecting signal according to the magnitude of the output current from the charging module. The communicating module has a communicating range and is for selectively outputting the detecting signal generated by the charging module to other charging equipments in the communicating range or receiving a detecting signal outputted from other charging equipments. The control module is electrically connected to the communicating module and is for selectively generating the control signal according to an adjusting signal outputted from other charging equipments or generating the control signal and an adjusting signal according to the detecting signal outputted from other charging equipments and the detecting signal generated by the charging module, and controlling the communicating module to output adjusting signal generated by the control module to other charging equipments.

BRIEF DESCRIPTION OF THE DRAWINGS

The present disclosure will become more fully understood from the detailed description given hereinbelow and the accompanying drawings, which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
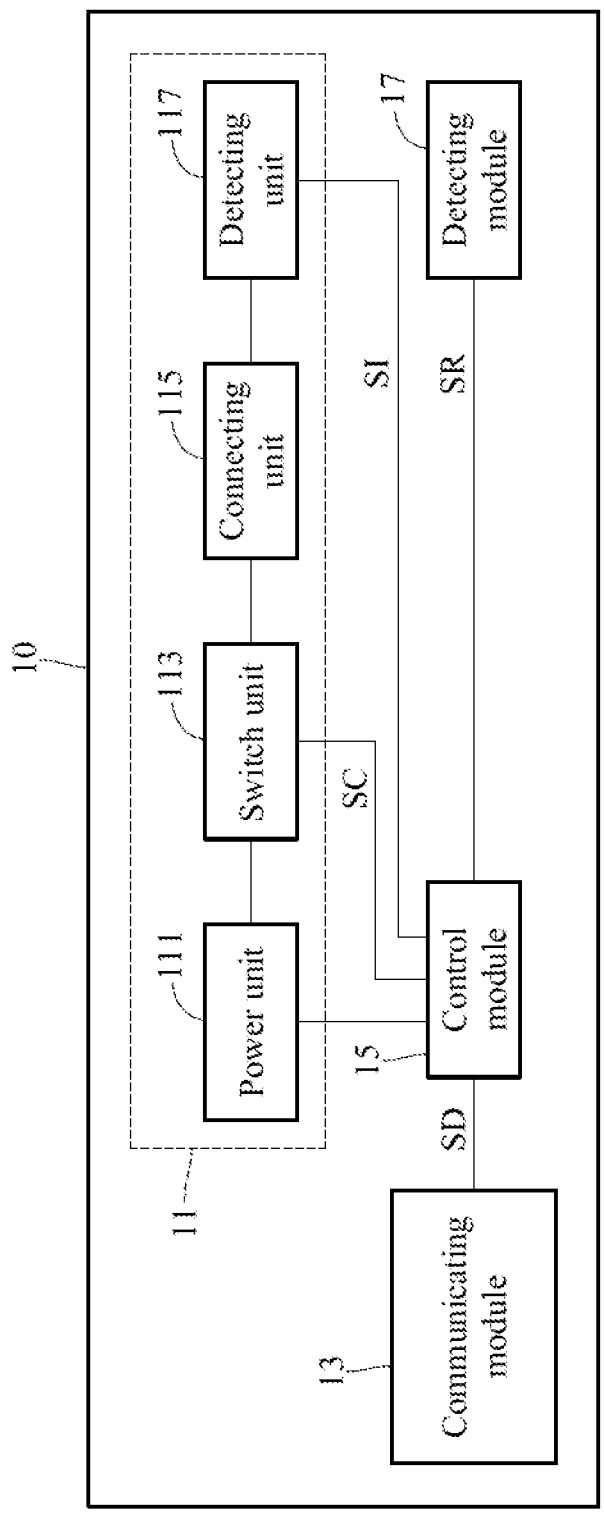
FIG. 1 is a functional block diagram of the charging equipment according to an embodiment.

Please refer to FIG. 1. FIG. 1 is a functional block diagram of the charging equipment according to an embodiment. As shown in FIG. 1, the charging equipment 10 is, for example, a container for containing and charging the device for charging, and the device for charging is, for example, a tablet, a notebook, a cell phone, a digital camera, a video camera, or any other electronic device capable of charging. The device for charging is placed in the container and is electrically connected to the charging equipment 10 through a wire or wirelessly, so that the charging equipment is able to charge the device for charging.

The charging equipment 10 includes a charging module 11, a communicating module 13, a control module 15, and a detecting module 17. The charging module 11 includes a power unit 111, a switch unit 113, a connecting unit 115, and a detecting unit 117. The power unit 111 is electrically connected to the switch unit 113 and the control module 15, and is electrically connected to an external power, so that the external power provides the power for the charging equipment. The external power is but not limited to mains electricity, direct current (DC), or other devices capable of charging the charging equipment.

The switch unit 113 is electrically connected to the connecting unit 115 and the control module 15, and is for selectively conducting the power unit 111 to charge the device for charging electrically connected to the connecting unit 115 according to the control signal SC generated by the control module 15. The switch unit 115 is but not limited to an electric relay or any other adequate switch component. The connecting unit 115 is, but not limited to, a USB slot, a mini USB slot, or any connector slot in other type.

The detecting unit 117 is electrically connected to the connecting unit 115 and the control module 15, and is for detecting the magnitude of the charging current outputted from the connecting unit 115 to the device for charging and generating a detecting signal SI accordingly and outputting the detecting signal SI to the control module 15.

The communicating module 13 has a communicating range and the communicating module 13 is electrically connected to the control module 15 for selectively outputting the detecting signal SI generated by the detecting unit 117 to other charging equipment in the communicating range or selectively receiving the detecting signal SI outputted from other charging equipment in the communicating range. The communicating module 13 is for communication connecting to other charging equipment in the communicating range, and outputting the signal to control other charging equipment or receiving the signal sent from other charging equipment. The specific details are described later. In the present embodiment, the communicating module 13 is connected to the communicating module of other charging equipment with Near Field Communication (NFC). Taking the stacked charging equipments for example, the charging equipment 10 sets the NFC chips on the top and the bottom of the container respectively, so that the charging equipment 10 is communication connected to the charging equipments on the top and the bottom through the NFC chips on the top and the bottom. In other embodiments, the communicating module 13 is also available to make the charging equipment 10 be electrically connected to other charging equipment through wired connections. The embodiment is only for illustrating the spirit of the present disclosure, but not for limiting the scope of the present disclosure.

The control module 15, depending on whether the charging equipment 10 is the master control equipment, selectively generates the control signal SC according to the adjusting signal outputted from other charging equipment, or selectively generates the control signal SC and the adjusting signal SD according to the detecting signal outputted from other charging equipment and the detecting signal SI generated by the charging module 11 to make the communicating module 13 output the adjusting signal SD to other charging equipment.

The detecting module 17 is electrically connected to the control module 15 for detecting the status of the charging equipment 10 and generating an indicating signal SR according to the status of the charging equipment 10. The status is in association with a location of the device for charging placed in the charging equipment 10. For example, the detecting module 17 is embedded in the opening part of the container, and when the user places the device for charging in the container or takes the device for charging out of the container, the detecting module 17 detects the movements of the user to the charging equipment 10 and generates the indicating signal SR accordingly. The detecting module 17 is also embedded in the container for placing the device for charging in the container. In other words, each container for placing the device for charging has a detecting module 17. When the user places the device for charging in the container or takes the device for charging out of the container, the detecting module 17 detects whether there is a device for charging on the container to generate the indicating signal SR accordingly.

The detecting module 17 sends the generated indicating signal SR to the control module 15, so that the control module 15 controls the detecting unit 117 to detect the magnitude of the output current from the connecting unit 115 according to the indicating signal SR to regenerate the detecting signal SI. Meanwhile, the control module 15 selectively makes the communicating module 13 output the regenerated detecting signal SI or selectively regenerate the control signal SC and the adjusting signal SD according to the regenerated detecting signal SI and the detecting signal outputted from other charging equipment to make the communicating module 13 output the regenerated adjusting signal SD to other charging equipment. In other embodiments, the charging equipment 10 is not embedded with the detecting module 17. The embodiment is only for illustrating the spirit of the present disclosure, but not for limiting the scope of the present disclosure.

Figure 2:
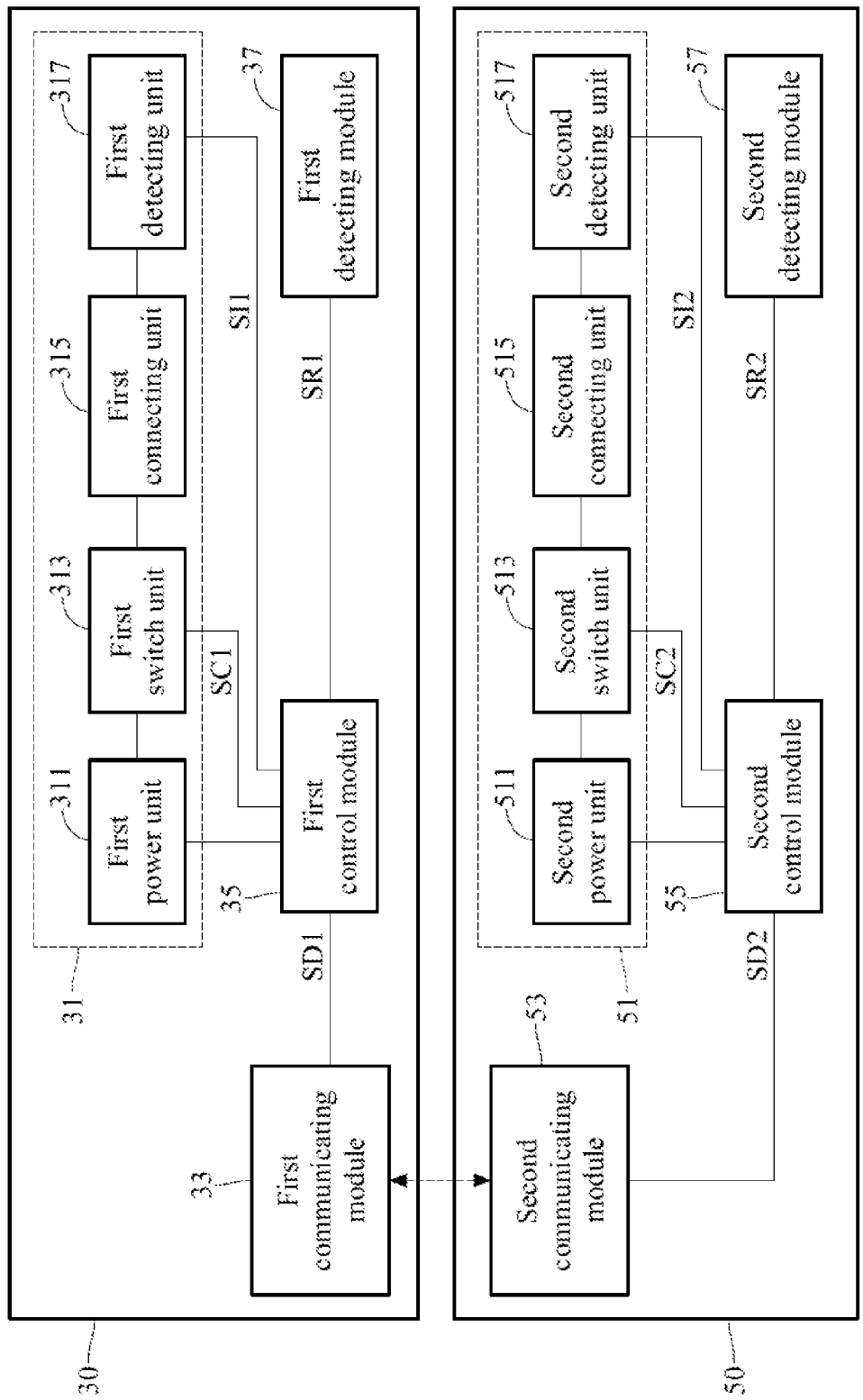
FIG. 2 is a functional block diagram of the charging system according to an embodiment.

In order to explain the charging system, the first charging equipment 30 and the second charging equipment 50 are taken as examples for the explanation. In practice, the charging system can include a plurality of charging equipments and the embodiment is for illustrating the spirit of the present disclosure, but not for limiting the scope of the present disclosure. Please refer to FIG. 2. FIG. 2 is a functional block diagram of the charging system according to an embodiment. As shown in FIG. 2, the first charging equipment 30 includes a first charging module 31, a first communicating module 33, a first control module 35, and a first detecting module 37. The second charging equipment 50 includes a second charging module 51, a second communicating module 53, a second control module 55, and a second detecting module 57. The first charging module 31 in the first charging equipment 30 and the second charging module 51 in the second charging equipment 50 are approximately identical to the charging module 11 shown in FIG. 1. The first communicating module 33 and the second communicating module 53 are approximately identical to the communicating module 13 shown in FIG. 1. The first control module 35 and the second control module 55 are approximately identical to the control module 15 shown in FIG. 1. The details are not further explained hereinafter.

The first charging equipment 30 is electrically connected to the external power through the first charging module 31 and the second charging equipment 50 is electrically connected to the external power through the second charging module 51. The second communicating module 53 is in the communicating range of the first communicating module 33, so that a charging system is formed by the first charging equipment 30 and the second charging equipment 50. Meanwhile, the charging system defines one of the first charging equipment 30 and the second charging equipment 50 as a master control equipment for charging management to the device for charging electrically connected to the first charging equipment 30 and the second charging equipment 50.

The method for the charging system to define the master control equipment is, for example, calculating the number of the devices for charging electrically connected to the first charging equipment 30 and the second charging equipment 50 and defining the charging equipment electrically connected to more devices for charging as the master control equipment, or calculating the magnitude of the output current from the first connecting unit 315 and the second connecting unit 515 and defining the charging equipment outputting larger magnitude of the current as the master control equipment.

Taking the second charging equipment 50 as the master control equipment for example, in the first charging equipment 30 the first switch unit 313 selectively conducting the first power unit 311 to charge the first device for charging electrically connected to the first connecting unit 315 according to the first control signal SC1. In the second charging equipment 50, the second switch unit 513 selectively conducting the second power unit 511 to charge the second device for charging electrically connected to the second connecting unit 515. The first detecting unit 317 generates the first detecting signal SI2 according to the magnitude of the output current from the first connecting unit 315. The second detecting unit 517 generates the second detecting signal SI2 according to the magnitude of the output current from the second connecting unit 515.

The first charging equipment 30 outputs the first detecting signal SI1 to the second charging equipment 50 through the first communicating module 33. The second charging equipment 50 receives the first detecting signal SI1 through the second communicating module 53. The second control module 55 of the second charging equipment 50 generates the second control signal SC2 and the adjusting signal SD2 according to the first detecting signal SI1 of the first charging equipment 30 and the second detecting signal SI2 generated by the second detecting unit 517 in the second charging equipment. The second communicating module 53 of the second charging equipment 50 outputs the adjusting signal SD2 to the first charging equipment 30, and the first charging equipment 30 receives the adjusting signal SD2 through the first communicating module 33, and the first control module 35 generates the first control signal SC1 according to the adjusting signal SD2 to control the first switch unit 313 to output the first current to charge the first device for charging. The second control module 55 controls the second switch unit 513 to output the second current to charge the second device for charging according to the second control signal SC2.

The second control module 55 generates the second control signal SC2 and the adjusting signal SD2 according to the first detecting signal SI1 and the second detecting signal SI2. For example, the sum of the current outputted from the first connecting unit 315 and the second connecting unit 515 is calculated according to the magnitude of the output current from the first connecting unit 315 indicated by the first detecting signal SI1 and the magnitude of the output current from the second connecting unit 515 indicated by the second detecting signal SI2. Whether the sum of the current outputted from the first connecting unit 315 and the second connecting unit 515 exceeds the rated current determines whether the charging sorting for the first charging equipment 30 and the second charging equipment 50 is performed.

The rated current is, for example, 15 Ampere (A) in the safety output current specification of the mains electricity. When the sum of the current outputted from the first connecting unit 315 and the second connecting unit 515 exceeds 15 A, the second control module 55 performs the charging sorting according to the needed magnitude of the output current for the first connecting unit 315 and second connecting unit 515 respectively. For example, the needed output current of the second connecting unit is 13 A and the needed output current of the first connecting unit is 10 A, and because the needed output current of the second connecting unit 515 is larger than the needed output current of the first connecting unit 315, the second charging equipment 50 is prior to the first charging equipment 30 in the charging sorting. The second control module 55 outputs the adjusting signal SD2 to the first control module 35 for indicating the first switch unit 313 to cut off, so that the first control module 35 generates the first control signal SC1 according to the adjusting signal SD2 to make the first switch unit 313 cut off and not charge the first device for charging. The second control module 55 generates the second control signal SC2 for indicating the second switch unit 513 to conduct or activate, so that the second switch unit 513 conducts or activates to charge the second device for charging. In other embodiments, the master control device can also be the prior device in the charging sorting. For example, when the second charging equipment 50 is the master control device, the priority of the second charging equipment 50 is higher than the priority of the first charging equipment 30 in the charging sorting.

In addition, when the sum of the current outputted from the first connecting unit 315 and the second connecting unit 515 does not exceed 15 A, the second control module 55 outputs the adjusting signal SD2 to the first control module 35 for indicating the first switch unit 313 to conduct or activate, and outputs the second control signal SC2 to the second switch unit 513 for indicating the second switch unit 513 to conduct or activate, so that the first control module 35 generates the first control signal SC1 according to the adjusting signal SD2 to make the first switch unit 313 and the second switch unit 513 conduct or activate together to charge the first device for charging and the second device for charging respectively.

When the first charging equipment 30 and the second charging equipment 50 complete the charging process to the first device for charging and the second device for charging respectively, the first switch unit 313 and second switch unit 513 automatically enter the hibernation. Meanwhile, the first detecting module 37 detects the first status of the first charging equipment 30 to generate the first indicating signal SR1 and the second detecting module 57 detects the second status of the second charging equipment 50 to generate the second indicating signal SR2. When the first control module 35 receives the first indicating signal SR1, the first control module 35 controls the first detecting unit 317 to regenerate the first detecting signal SI1 according to the magnitude of the output current from the first connecting unit 315, and outputs the first detecting signal SI1 to the second charging equipment 50 through the first communicating module 33. The second charging control module 55 regenerates the second control signal SC2 and the adjusting signal SD2 according to the first detecting signal SI1 regenerated by the first detecting unit 317 and the second detecting signal S12 generated by the second detecting unit 517, and outputs the adjusting signal SD2 to the first charging equipment 30.

When the second control module 55 receives the second indicating signal SR2 generated by the second detecting module 57, the second control module 55 controls the second detecting unit 517 to regenerate the second detecting signal S12 according the magnitude of the output current from the second connecting unit 515. The second charging control module 55 regenerates the second control signal SC2 and the adjusting signal SD2 according to the second detecting signal S12 regenerated by the second detecting unit 517 and the first detecting signal SI1 outputted from the first charging equipment 30, and outputs the adjusting signal SD2 to the first charging equipment 30.

Through the first detecting module 37 and the second detecting module 57, the first charging equipment 30 and the second charging equipment 50 are able to enter the hibernation after finishing the charging process to the first device for charging and the second device for charging, so that the charging system saves more energy. Furthermore, the first detecting module 37 and the second detecting module 57 detect the first status and the second status once every default period, such as detecting the status of the first charging equipment 30 and the second charging equipment 50 every 15 minutes, so that the first charging equipment 30 detects the status of the electrically connected first device for charging again and the second charging equipment 50 detects the status of the electrically connected second device for charging again for activating the charging system again.

Figure 3:
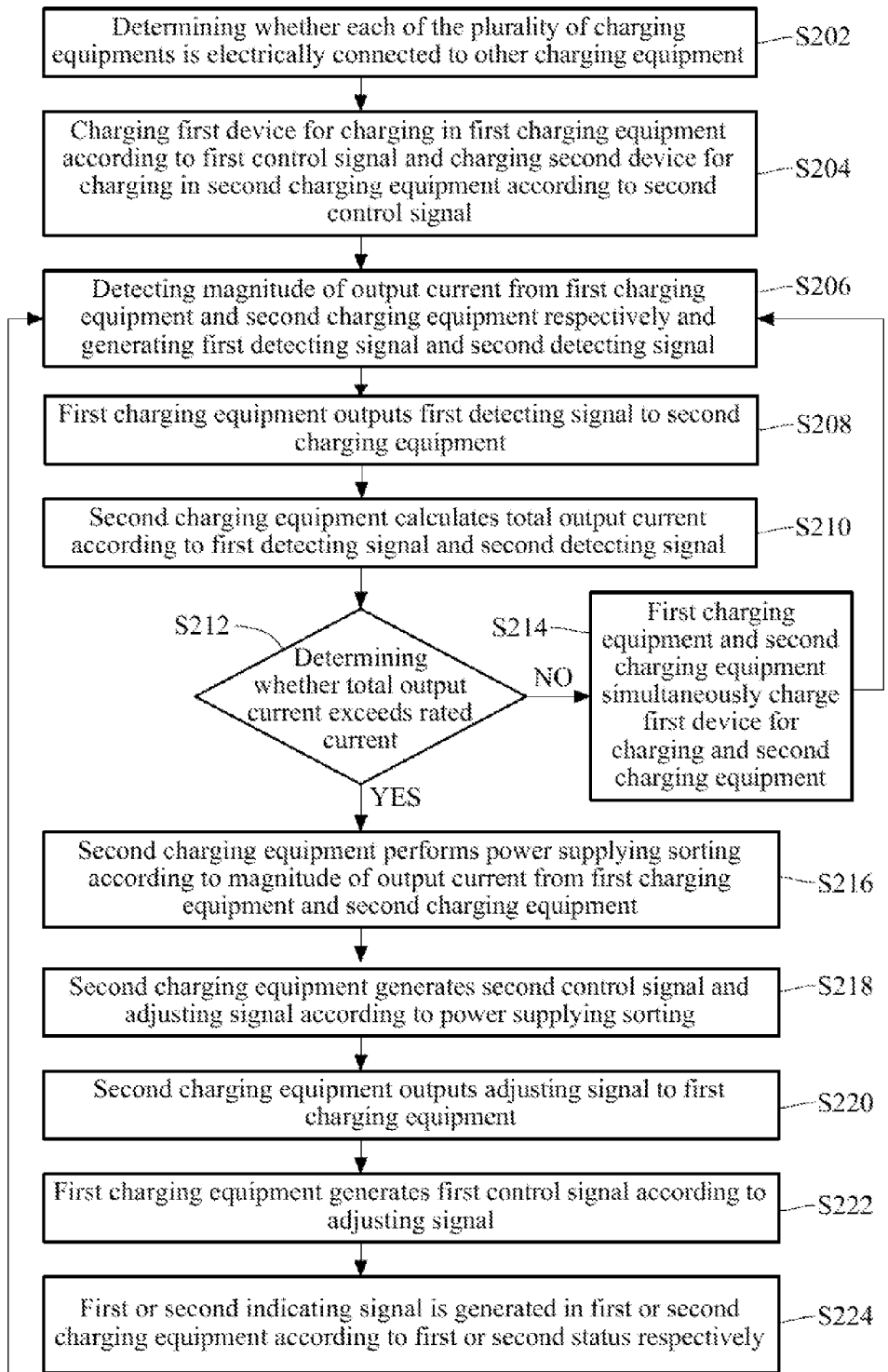
FIG. 3 is a flowchart of the control method of the charging system according to an embodiment.

In order to explain the control method of the charging system in the present disclosure, the charging system is described together as follows. Please refer to FIG. 2 and FIG. 3. FIG. 3 is a flowchart of the control method of the charging system according to an embodiment. As shown in FIG. 2 and FIG. 3, in the step S202, each of the charging equipments in the charging system determines whether the charging equipment is electrically connected to other charging equipment and defines one of the charging equipments as the master control equipment. In the present embodiment, the first charging equipment 30 and the second charging equipment 50 are taken as examples for the explanation and the second charging equipment 50 is defined as the master control equipment of the charging system.

In the step S204, in the first charging equipment 30 and the second charging equipment 50, the first device for charging and the second device for charging are charged according to the first control signal SC1 and the second control signal SC2 respectively.

In the step S206, in the first charging equipment 30, the magnitude of the charging current outputted from the first charging equipment 30 to the first device for charging is detected and a first detecting signal SI1 is generated. In the second charging equipment 30, the magnitude of the charging current outputted from the second charging equipment 50 to the second device for charging is detected and a second detecting signal SI2 is generated.

In the step S208, the first charging equipment 30 outputs the first detecting signal SI1 to the second charging equipment 50. In the step S210, the second charging equipment 50 calculates the total output current of the first charging equipment 30 and the second charging equipment 50 according to the first detecting signal SI1 and the second detecting signal SI2. In the step S212, the second charging equipment 50 determines whether the total output current exceeds the rated current. In the step S214, when the total output current does not exceed the rated current, the first charging equipment 30 and the second charging equipment 50 simultaneously charge the first device for charging and the second charging equipment.

In the step S216, when the total output current exceeds the rated current, the second charging equipment 50 performs the power supplying sorting according to the magnitude of the output current from the first charging equipment 30 and the second charging equipment 50. In the step S218, the second charging equipment 50 generates the second control signal SC2 and the adjusting signal SD2 according to the power supplying sorting. In the step S220, the second charging equipment 50 outputs the adjusting signal SD2 to the first charging equipment 30. In the step S222, the first charging equipment 30 generates the first control signal SC1 according to the adjusting signal SD2 to control the first charging equipment 30 to charge the first device for charging.

When the first charging equipment 30 and the second charging equipment 50 finish the charging process, in the step S224, the first detecting module 37 of the first charging equipment 30 generates the first indicating signal SR1 according to the first status to make the first charging equipment 30 go back to the step S206 to detect the magnitude of the output current from the first charging equipment 30 to the first device for charging, and the second detecting module 57 of the second charging equipment 50 generates the second indicating signal SR2 according to the second status to make the second charging equipment 50 go back to the step S206 to detect the magnitude of the output current from the second charging equipment 50 to the second device for charging.

The charging equipment of the present disclosure is electrically connected other charging equipment through the communicating module to form a charging system. In the charging system, a master control equipment is defined from a plurality of charging equipments for charging management, so that when the plurality of charging equipments are simultaneously operated, the power trip problem is less likely to happen. In an embodiment, the charging system further performs the charging sorting to each of the plurality of charging equipments, so that the charging system is able to provide power to each of the plurality of charging equipments according to the charging sorting to enhance the charging efficiency.

The foregoing description has been presented for purposes of illustration. It is not exhaustive and does not limit the disclosure to the precise forms or embodiments disclosed. Modifications and adaptations will be apparent to those skilled in the art from consideration of the specification and practice of the disclosed embodiments of the disclosure. It is intended, therefore, that the specification and examples be considered as exemplary only, with a true scope and spirit of the disclosure being indicated by the following claims and their full scope of equivalents.

What is claimed is:

1. A charging system, comprising:
a first charging equipment, comprising:
a first charging module, electrically connected to an external power, for charging at least one first device electrically connected to the first charging equipment according to a first control signal and generating a first detecting signal according to a magnitude of an output current from the first charging module;
a first communicating module, operating in a first communicating range, for outputting the first detecting signal; and
a first control module, electrically connected to the first communicating module, for generating the first control signal according to an adjusting signal received by the first communicating module; and
a second charging equipment, comprising:
a second charging module, electrically connected to the external power, for charging at least one second device which is electrically connected to the second charging equipment according to a second control signal and generating a second detecting signal according to a magnitude of an output current from the second charging module;
a second communicating module, operating in the first communicating range, for receiving the first detecting signal and outputting the adjusting signal to the first communicating module; and a second control module, electrically connected to the second communicating module, for generating the second control signal and the adjusting signal according to the first detecting signal and the second detecting signal.

2. The system of claim 1, wherein the first charging equipment further comprises:

a first detecting module for generating a first indicating signal according to a first status, wherein the first status is in association with a location of the first device for charging placed in the first charging equipment, and the first control module controls the first charging module to regenerate the first detecting signal according to the first indicating signal, and the second control module further regenerates the second control signal and the adjusting signal according to the regenerated first detecting signal and the second detecting signal and makes the second communicating module output the regenerated adjusting signal to the first control module.

3. The system of claim 1, wherein the second charging equipment further comprises:

a second detecting module, for generating a second indicating signal according to a second status, wherein the second status is in association with a location of the second device for charging placed in the second charging equipment, and the second control module controls the second charging module to regenerate the second detecting signal according to the second indicating signal, and the second control module further regenerates the second control signal and the adjusting signal according to the regenerated second detecting signal and the first detecting signal and makes the second communicating module output the regenerated adjusting signal to the first charging equipment.

4. The system of claim 1, wherein the first charging module comprises:

a first power unit, electrically connected to the external power;

a first switch unit, electrically connected to the first power unit, for providing a first current according to the first control signal by conducting electricity;

at least one first connecting unit electrically connected to the first switch unit, for receiving the first current and charging the first device which is electrically connected to the first charging equipment with the first current; and a first detecting unit electrically connected to said at least one first connecting unit, for detecting the magnitude of the output current from said at least one first connecting unit to the first device for charging and generating the first detecting signal according to a magnitude of the output current from the first connecting unit.

5. The system of claim 1, wherein the second charging module comprises:

a second power unit, electrically connected to the external power;

a second switch unit, electrically connected to the second power unit, for providing a second current according to the second control signal by conducting electricity;

at least one second connecting unit electrically connected to the second switch unit, for receiving the second current and charging the second device which is electrically connected to the second charging equipment with the second current; and a second detecting unit electrically, connected to said at least one second connecting unit, for detecting the magnitude of the output current from said at least one second connecting unit to the second device for charging and generating the second detecting signal according to the magnitude of the output current from said at least one second connecting unit.

6. A charging equipment, comprising:

a charging module, electrically connected to a external power, for charging at least one device for charging, which is electrically connected to the charging equipment according to a control signal and generating a detecting signal according to a magnitude of the output current from the charging module;

a communicating module, operating in a communicating range, for selectively outputting the detecting signal generated by the charging module to another charging equipment operating in the communicating range or receiving a detecting signal outputted from said another charging equipment; and a control module, electrically connected to the communicating module, for selectively generating the control signal according to an adjusting signal outputted from said another charging equipment or generating the control signal and an adjusting signal according to the detecting signal outputted ether said another charging equipment and the detecting signal generated by the charging module, and controlling the communicating module to output adjusting signal generated by the control module to said another charging equipment.

7. The charging equipment of claim 6, further comprising:

a detecting module for generating an indicating signal according to a status, wherein the status is in association with a location of said at least one device for charging placed in the charging equipment, and the control module controls the charging module to regenerate the detecting signal according to the indicating signal, and the control module selectively controls the communicating module to output the regenerated detecting signal, or the control module regenerates the control signal and the adjusting signal according to the regenerated detecting signal and the detecting signal outputted from said another charging equipment and controls the communicating module to output the regenerated adjusting signal to said another charging equipment.

8. The charging equipment of claim 6, wherein the charging module comprises:

a power unit, electrically connected to the external power or another charging equipment selectively;

a switch unit, electrically connected to the power unit, for providing a charging current according to the control signal by conducting electricity;

at least one connecting unit, electrically connected to the switch unit, for receiving the charging current and charging the device for charging which is electrically connected to the charging equipment with the charging current; and a detecting unit, electrically connected to said at least one connecting unit, for detecting the magnitude of the output current from the connecting unit to the device for charging and generating the detecting signal according to a magnitude of the output current from the connecting unit.

9. A method for controlling a charging system for a plurality of charging equipments, the plurality of charging equipments defining as at least one a charging equipment and a second charging equipment, the method comprising:
- charging at least one first device for charging in the first charging equipment according to a first control signal;
- charging at least one second device for charging in the second charging equipment according to a second control signal;
- detecting a magnitude of the output current from the first charging equipment to said at least one first device for charging and generating a first detecting signal;
- detecting a magnitude of the output current from the second charging equipment to said at least one second device for charging and generating a second detecting signal;
- outputting the first detecting signal from the first charging equipment to the second charging equipment;
- generating the second control signal and an adjusting signal in the second charging equipment according to the first detecting signal and the second detecting signal;
- outputting the adjusting signal from the second charging equipment to the first charging equipment; and
- generating the first control signal in the first charging equipment according to the adjusting signal.

10. The method of claim 9, further comprising determining whether each charging equipment of the plurality of charging equipments is electrically connected to another charging equipment and defining the plurality of charging equipments electrically connected to each other as the first charging equipment and the second charging equipment.

11. The method of claim 9, further comprising:
- generating a first indicating signal in the first charging equipment according to a first status, the first status in association with a location of said at least one first device for charging placed in the first charging equipment;
- regenerating the first detecting signal in the first charging equipment according to the first indicating signal;
- outputting the regenerated first detecting signal from the first charging equipment to the second charging equipment;
- regenerating the second control signal and the adjusting signal in the second charging equipment according to the regenerated first detecting signal and the second detecting signal; and
- outputting the regenerated adjusting signal from the second charging equipment to the first charging equipment.

12. The method of claim 11, wherein in the first charging equipment, the first charging equipment generates the first indicating signal in every default period according to the first status.

13. The method of claim 9, further comprising:
- generating a second indicating signal in the second charging equipment according to a second status, the second status in association with a location of said at least one second device for charging placed in the second charging equipment;
- regenerating the second detecting signal in the second charging equipment according to the second indicating signal;
- regenerating the second control signal and the adjusting signal in the second charging equipment according to the regenerated second detecting signal and the first detecting signal received by the first charging equipment; and
- outputting the regenerated adjusting signal from the second charging equipment to the first charging equipment.

14. The method of claim 13, wherein in the second charging equipment, the second charging equipment generates the second indicating signal in every default period according to the second status.

15. The method of claim 9, wherein the generating the second control signal and an adjusting signal according to the first detecting signal and the second detecting signal, comprising:
- calculating a total output current by the second charging equipment according to the first detecting signal and the second detecting signal, wherein the total output current is a sum of the magnitude of the output current from the first charging equipment to charge said at least one first device for charging and the magnitude of the output current from the second charging equipment to charge said at least one second device for charging;
- determining, by the second charging equipment, whether the total output current exceeds the rated current;
- when the total output current exceeds a rated current, the second charging equipment performing a power supplying sorting to the first charging equipment and the second charging equipment according to the magnitude of the output current from the first charging equipment and the second charging equipment; and
- generating the second control signal and the adjusting signal by the second charging equipment according to the power supplying sorting.

16. The method of claim 15, wherein when the total output current does not exceed the rated current, the second charging equipment generates the second control signal and the adjusting signal for the first charging equipment to charge said at least one first device for charging and for the second charging equipment to charge said at least one second device for charging.

* * * * *